(12) United States Patent
Larsen

(10) Patent No.: US 12,462,351 B2
(45) Date of Patent: Nov. 4, 2025

(54) IMAGE PROCESSING SYSTEM

(71) Applicant: Lars Michael Larsen, Charlottenlund (DK)

(72) Inventor: Lars Michael Larsen, Charlottenlund (DK)

( * ) Notice: Subject to any disclaimer, the term of this patent is extended or adjusted under 35 U.S.C. 154(b) by 148 days.

(21) Appl. No.: 18/570,339

(22) PCT Filed: Jun. 17, 2022

(86) PCT No.: PCT/EP2022/066551
§ 371 (c)(1),
(2) Date: Dec. 14, 2023

(87) PCT Pub. No.: WO2022/263626
PCT Pub. Date: Dec. 22, 2022

(65) Prior Publication Data
US 2024/0265509 A1 Aug. 8, 2024

(30) Foreign Application Priority Data
Jun. 18, 2021 (EP) .................. 21180261.6

(51) Int. Cl.
*G06T 5/70* (2024.01)
(52) U.S. Cl.
CPC ...... *G06T 5/70* (2024.01); *G06T 2207/10024* (2013.01)
(58) Field of Classification Search
None
See application file for complete search history.

(56) References Cited

U.S. PATENT DOCUMENTS

| 10,331,207 | B1* | 6/2019 | Simmons | H04N 13/383 |
| 11,160,688 | B2* | 11/2021 | Cho | G06T 11/60 |
| 2011/0122144 | A1* | 5/2011 | Gabay | A61B 3/032 |
| | | | | 345/589 |

(Continued)

FOREIGN PATENT DOCUMENTS

| EP | 3542857 A1 | 9/2019 |
| WO | 9731286 A1 | 8/1997 |

(Continued)

OTHER PUBLICATIONS

Barsky, A.B. et al, "Vision Correcting Displays Based on Inverse Blurring and Aberration Compensation" Springer International Publishing Switzerland, 2015, L. Agapito et al (Eds.): ECCV 2014 Workshops, Part III, LNCS 8927, pp. 524-538.

(Continued)

*Primary Examiner* — Ryan M Gray
(74) *Attorney, Agent, or Firm* — DINSMORE & SHOHL LLP

(57) ABSTRACT

The present disclosure relates to an image processing system comprising: a display; and a processing unit configured to: obtain an indication or a degree of myopia or hyperopia or emmetropia of a subject; process digital images composed of a red color layer, a green color layer and a blue color layer or other color separation by selectively blurring the color layers based on the indication or degree of myopia or hyperopia or emmetropia of the subject to generate manipulated digital images, and display the manipulated digital images on the display.

11 Claims, 7 Drawing Sheets

(56) References Cited

U.S. PATENT DOCUMENTS

| | | | | |
|---|---|---|---|---|
| 2013/0215147 A1* | 8/2013 | Hilkes | ................... | G09G 5/377 |
| | | | | 345/633 |
| 2013/0286053 A1* | 10/2013 | Fleck | ................... | G09G 5/377 |
| | | | | 345/82 |
| 2016/0180503 A1* | 6/2016 | Frascati | ................... | A61B 3/02 |
| | | | | 345/646 |
| 2016/0270656 A1* | 9/2016 | Samec | ................... | A61B 3/08 |
| 2017/0205977 A1* | 7/2017 | Fertik | ................... | G06F 3/0483 |
| 2020/0110265 A1* | 4/2020 | Serdarevic | ........... | A61B 3/0008 |
| 2021/0052368 A1* | 2/2021 | Smadja | ................. | G02C 11/04 |

FOREIGN PATENT DOCUMENTS

| | | | |
|---|---|---|---|
| WO | 2012097213 | A2 | 7/2012 |
| WO | 2016149416 | A1 | 9/2016 |
| WO | 2018152596 | A1 | 8/2018 |
| WO | 2020243771 | A1 | 12/2020 |
| WO | 2021055162 | A1 | 3/2021 |

OTHER PUBLICATIONS

Gawne, T.J. et al, "An opponent dual-detector spectral drive model of emmetropization", Vision Research, Elsevier, Amsterdam, NL vol. 173, May 19, 2020, pp. 7-20.

Rucker, J.F. et al, Chick eyes compensate for chromatic simulations of hyperopic and myopic defocus: Evidence that the eye uses longitudinal chromatic aberration to guide eye-growth, Vision Res. Jul. 2009, 49(14), 1775-1783.

\* cited by examiner

IMAGE PROCESSING SYSTEM

CROSS-REFERENCE TO RELATED APPLICATIONS

This application is the U.S. National Stage of PCT/EP2022/066551 filed on Jun. 17, 2022, which claims priority to European Patent Application 21180261.6 filed on Jun. 18, 2021, the entire content of both are incorporated herein by reference in their entirety.

FIELD OF THE INVENTION

The disclosure relates to an image processing system. The system may be used for assisting emmetropization of a subject. The disclosure further relates to a computer program and a method for processing digital images in an electronic device.

BACKGROUND OF THE INVENTION

Emmetropization is the mechanism by which the eye naturally adjusts its dimensions, in the developing eyes of in infants, children and teenagers, so that it reaches the postulated ideal condition of having very distant objects in focus on the retina without having to activate its internal muscular apparatus and the associated focusing mechanism, i.e. its mechanism of accommodation. Occasionally, emmetropization or an aberration thereof, can extend into adulthood. A commonly accepted model of the emmetropization is that, from a state of hyperopia in the infant, related to the eye of the new-born being relatively short, the eye will elongate by expansion of its posterior part until it reaches emmetropia, at which point the eye will stop elongating. The stimulus for elongation and stabilization appears to come from light of different wavelengths being in focus at different depths within the eye, counted from the apex of the cornea, and from the perception of light being divided into three classes of color-sensitive receptors.

The refractive components of the eye project the different wavelength components of an external scenery in focus at different depths, a phenomenon called longitudinal chromatic dispersion. This may be described, as a simplification, as any image formed in the eye having three separate components, a red, a green and a blue, which are in focus at different depths. This has the effect of the different color layers of the image that reaches the retina having different degrees of sharpness. Experiments in tree shrews, non-human primates, chicks and guinea pigs support that the variation in sharpness of the images received by the different arrays of daylight photoreceptors in the retina provides a stimulus for emmetropization. Humans have three types of color-selective daylight photoreceptors (cones): short-wavelength sensitive cones, medium-wavelength sensitive cones and long-wavelength sensitive cones, which correspond to the sensation of the colors blue, green and red, respectively, to the extent that they can be selectively stimulated. Many of the animals that have been used to study emmetropization have only two types of cone photoreceptors, corresponding to the short-wavelength sensitive cones and the long-wavelength sensitive cones of humans.

Refraction develops from a state of hyperopia at birth, when the eye is short. Ideally, the eye elongates by gradual expansion of its posterior part until the retina has moved to the focal plane of the cornea-lens complex in its relaxed state. The eye has then reached the state of emmetropia (absence of hyperopia and myopia) and there is no need for spectacle correction or contact lens correction for unaccommodated distance vision, unaccommodated vision meaning vision without activation of the active focusing mechanism of the eye. In humans, failure of emmetropization, which is predominantly in the form of myopia (near-sightedness), is related to excessive near-work and insufficient exposure to outdoor light. Refraction and ocular axial length are largely stable after the age of 20 years.

Intervention to slow progression of myopia in children comprehend use of spectacles, multi-focal spectacles, bi-focal soft contact lenses, medications such as pirenzepine and atropine, and other methods, alone or in combination. Most of these techniques achieve only moderate results. There is thus a need for alternative methods for assisting emmetropization.

SUMMARY OF THE INVENTION

The present disclosure provides an image processing system for producing new images or manipulating existing images, preferably in an electronic device, for display on an electronic device, in print or otherwise. The system can be used in the long or the short term to assist emmetropization of a subject or group of subjects.

In a simplified model, a scenery illuminated by sunlight that is observed by the human eye can be said to have a representation in the human sensory system that consists of three color layers. Therefore it is possible to produce the sensation of full-spectrum color images by a luminescent display that consists of three overlapping arrays of light sources, each emitting light of a single primary color, perceived by a human observer, when lit one array at a time, as being red, green, or blue. Thus, natural full-color sceneries can be reproduced by the display of images with three overlapping color layers in patterns of varying relative intensity.

In particular, for a subject with myopia, the presently disclosed image processing system may be configured to blur the blue layer of an image or a sequence of images, while maintaining or even increasing the level of contrast of the red layer of the image or sequence of images. Conversely, for a subject with hyperopia, the system may be configured to blur the red layer of the same image while maintaining or even increasing the level of contrast of the blue layer of the image or sequence of images.

To simplify the description of the invention, this text will present the control of emmetropization as an interaction between blue and red image layers while leaving the green color to be omitted, used in an intermediate role or grouped together with green or blue. The present disclosure relates to, according to a first embodiment, an image processing system comprising:
  a display;
  a processing unit configured to:
   a. obtain an indication or a degree of myopia or hyperopia or emmetropia of a subject;
   b. process digital images composed of a red color layer, a green color layer and a blue color layer or other color separation by selectively blurring the color layers based on the indication or degree of myopia or hyperopia or emmetropia of the subject to generate manipulated digital images,
    i. wherein the blue color layer of the digital images is blurred, and the red color layer of the digital images is not modified, or sharpened, for a subject associated with myopia, and/or ii. wherein the red color layer of the digital images is blurred, and the blue color layer of the digital images is not modified, or sharpened, for a subject associated with hyperopia, c. display the manipulated digital images on the display.

In one embodiment of the present disclosure, the processing unit may be configured to obtain an indication of the presence of myopia or hyperopia and the degree of myopia or hyperopia of a subject or an indication that the subject is emmetropic, as well as indications of the subject's age, refractive error, predisposition to the development of myopia and other physiological parameters, when available;

In one embodiment of the present disclosure, the processing unit may be configured to process digital images composed of a red color layer, a green color layer and a blue color layer or other color separation by selectively blurring or sharpening or leaving unaltered (not altered) the color layers based on the indication or degree of myopia or hyperopia or the state of emmetropia of the subject to generate manipulated digital images.

In one embodiment of the present disclosure, the blurring may be adjusted for astigmatism, so that in regular astigmatism, blurring is applied to edges that run in one direction, whereas edges running at a right angle to the former are left unblurred (not blurred). Intermediate lines may be blurred in proportion to their angular alignment with the former.

In one embodiment of the present disclosure, blurring is applied in proportion to whether the user is using or not using his or her refractive correction.

In one embodiment of the present disclosure, blurring is applied according to a preferred compromise according to the calculated ideal DOE (design of experiment) of the user's right eye and that of the user's left eye.

In one embodiment of the present disclosure, two slightly different images are shown to a subject's two eyes by interlacing the presentation using alternate electromechanical shutting of a viewing device, a split-screen viewer or another stereoscopic display mode.

The image processing system preferably obtains information on whether the subject is associated with myopia, hyperopia or emmetropia and it uses an electronic device in order to display images, where different levels of blur of the three chromatic layers, namely red, green and blue, are generated in order to assist emmetropization.

The method is based on the human eye being sensitive to the spectral composition of incoming light and the graded refraction of incoming light according to its constituent wavelengths (chromatic dispersion), which has the effect that some wavelengths throw a sharper image than others on the retinal photoreceptor layer (longitudinal chromatic dispersion) and an image of a different size (lateral chromatic dispersion). For ease of illustration, it may be supposed that the hypothetical scenery is illuminated by three narrow spectral bands of red, green and blue light or that it is emitted by a screen display with three classes of narrow-band light sources. The red, green and blue images will then be in focus at three different depths inside the eye. Since all three types of color-sensitive daylight photoreceptors are interspersed in the same thin layer of the retina, only one of the three images can be in focus on the retinal photoreceptor layer and seen with optimal sharpness at any time. The order of the images is such, that if the green image is in optimal focus, the blue image will be in front of the photoreceptors and the red image will be in focus behind the photoreceptors. Because the photoreceptors are all in one layer, the green image will be sharp, whereas the blue and the red images will be relatively unsharp. The position where the image is sensed is actually the same for all three images (blue, green and red), namely at the retina. Thus, two of the images, the blue and the red, will be blurred compared to the green image. The conscious image is a composite one, composed of all ambient spectral components of light and perceived as uniform colors, the blend of which is not perceptible. Thus, there can be no conscious selection of which primary color to see with the greatest sharpness.

The colored components of white light are focused at different distances from the image-forming anterior segment of the eye. Blue is focused nearest to the cornea, red is focused farthest from the cornea, green is focused between blue and red, closest to the retina. This phenomenon of longitudinal chromatic aberration provides a cue, consisting of different degrees of blur for different colors, whereby the longitudinal growth of the eye can reach the nominally ideal condition of emmetropia, which permits optimal relaxed vision of distant objects. If the eye is short, the blue image will be the sharpest one and the eye will elongate, thus bringing the retina nearer to the position of maximum sharpness of the green and red images. If the eye is long, so that the red image is the sharpest one, the eye will stop elongating.

Myopia is a condition where the eye overshoots its target length, which makes it too long and therefore unfit for sharp sight at long distance. During emmetropization, according to one model, sharp red images will stop elongation of the eye and prevent or limit shortsightedness, whereas sharp blue images will promote elongation of the eye, at the risk of inducing myopia.

Standard color displays are capable, to varying degrees, of eliciting a sensation of seeing a full spectrum of colors by using overlapping layers of monochrome images, one red, one green and one blue, which are mixed in varying proportions for each location on the screen. These three standard colors can be referred to as color layers of the image. The three superimposed monochrome images have separate digital representations in the computer and can be modified individually to produce images with new properties derived from the original ones. The color layers correspond roughly to the affinities of the three types of daylight sensors or receptors or cones in the retina, namely short-wavelength sensitive cones, medium-wavelength sensitive cones and long-wavelength sensitive cones.

The present disclosure addresses the issues of myopia and hyperopia in infants, children and adolescents by a new approach based on manipulation of digital images. The present disclosure also addresses the issue of subjects with emmetropia having a risk of developing myopia. The disclosure considers that refraction matures as the result of a dynamic process and that there is a highly prevalent preference for the end-result being emmetropia. An alternative preference or tolerable outcome is a mild degree of myopia that facilitates reading without spectacle or contact lens correction, which can be considered an advantage for the person who has developed presbyopia.

With hyperopia, the eyeball is too short, relative to the properties of its anterior segment, for objects at distance to come in focus on the retina without the effort of muscular contraction inside the eye. This may cause undesirable strain and fatigue. With myopia the eyeball is too long, relative to the properties of its anterior segment, for objects at distance to be in focus on the retina. Emmetropia is a condition, conventionally described as ideal, where the relaxed eye has optimal angular resolution at distance without any effort of the muscles inside the eye. An emmetropic eye is therefore said to have no refractive error. While hyperopia is common in children, it tends to be overcome by compensatory inner-eye muscular correction (accommodation), which may go unnoticed, if it does not cause headache, strabismus, reading fatigue or other complaints, signs or symptoms.

In one embodiment of the presently disclosed method, in case of a condition of emmetropia of the subject, who is, for example, young enough to be at risk of myopia, the blue color layer of a red-green-blue composite image produced a light-emitting digital display, is blurred while the red layer is left unmodified, or it is sharpened. Emmetropization of the eye can therefore be assisted by the method hereof, implemented on an electronic device, where the levels of blur and sharpness of the color layers, namely red, green and blue, can be adjusted selectively.

The color layers blue, green and red should be construed broadly and considered as the color layers that are selectively or preferentially sensed by the receptors in the eye, namely short-wavelength sensitive cones, medium-wavelength sensitive cones and long-wavelength sensitive cones.

The inventor has furthermore realized that while children and young adults generally have a range of accommodation that allows any of its component color layers to be in sharp focus on the retina, an image that has been induced to have blurred blue edges but sharp red edges will only be seen at maximum sharpness when the red image is brought into focus by the process of accommodation. Thus, any given image can be manipulated electronically, such that when it is shown on a digital display, it will induce a preference for seeing a pre-determined color layer sharper than other color layers, thereby promoting the preservation of a desirable state of refraction or a desirable change in the refraction of an individual, one outcome of which may be the prevention of myopia.

The inventor has furthermore realized that the level of blur or sharpening imposed on a given color layer may be set according to information about the user that can be collected via the electronic device, when it configured to do so, or according to information about the user that it collected by a person trained in the art of (e.g. an optometrist or an ophthalmologist) or by a person operating an automated refractioning apparatus or by a fully automated refractometer. The level of blurriness may depend on, in one embodiment, pupil diameter. The part of an image to be blurred or sharpened and the degree to which that part is blurred or sharpened may be selected according to information about the user's point of fixation on the screen that is collected during use of the screen by a camera or other device that monitors the user. The blur or sharpening may be selectively imposed, in one embodiment, so that it corresponds to the user's peripheral visual field or a specific section thereof. The level of blurriness may depend on, in another embodiment, whether the subject is wearing spectacles or contact lenses, and on the distance of the subject to the screen.

Furthermore, in one embodiment, a level of blurriness of the green layer, which is less than the level of blurriness of the blue layer may be used for a subject associated with myopia. In addition, in another embodiment, the level of blurriness of the green layer, which is less than the level of blurriness of the red layer, may be used for a subject associated with hyperopia. In a third embodiment, the level of blur of the green layer may be set as that of the blue layer or the red layer. In a further embodiment, the levels of blur of individual color layers may be set according to new information about the process of emmetropization in humans its sensitivity to color and sharpness. In a further embodiment the level of blur of individual color layers may be set to experimental value in order to obtain new information about the process of emmetropization.

In one embodiment of the presently disclosed invention, an effective level of blurriness may match that of at least one diopter or at least two diopters of chromatic aberration.

In one embodiment of the present disclosure, the level of contrast of the different color layers can be adjusted by programming or configuring the electronic device that is implementing the method and the so modified images or sequence of images can be therefore displayed on the screen of such device. According to the disclosed method, the emmetropization of the subject that is exposed to these images may therefore be assisted. In one embodiment of the presently disclosed method the images can be fully modified or, in another embodiment, only parts of the images, for example the contours, can be modified to implement emmetropization assistance.

The present disclosure further relates to, in one embodiment, a computer program having instructions which, when executed by a computing device or computing system, cause the computing device or computing system to carry out a method of assisting emmetropization of a subject, the method comprising the steps of:

obtaining an indication or a degree of myopia or hyperopia or emmetropia of the subject;

processing digital images composed of a red color layer, a green color layer and a blue color layer or other color separation in an electronic device by selectively blurring the color layers based on the indication or degree of myopia or hyperopia or emmetropia of the subject to generate emmetropization-manipulated digital images,
  i. wherein the blue color layer of the digital images is blurred, and the red color layer of the digital images is not modified, or sharpened, for a subject associated with myopia, and/or
  ii. wherein the red color layer of the digital images is blurred, and the blue color layer of the digital images is not modified, or sharpened, for a subject associated with hyperopia, displaying the emmetropization-manipulated digital images on a screen of the electronic device.

In one embodiment of the present disclosure, the obtained images may promote emmetropization or any other desirable change in refraction.

The present disclosure further relates to a method of assisting emmetropization of a subject, the method comprising the steps of:

obtaining an indication or a degree of myopia or hyperopia or emmetropia of the subject;

processing digital images composed of a red color layer, a green color layer and a blue color layer or other color separation in an electronic device by selectively blurring the color layers based on the indication or degree of myopia or hyperopia or emmetropia of the subject to generate emmetropization-manipulated digital images,
  i. wherein the blue color layer of the digital images is blurred, and the red color layer of the digital images is not modified, or sharpened, for a subject associated with myopia, and/or
  ii. wherein the red color layer of the digital images is blurred and the blue color layer of the digital images is not modified, or sharpened, for a subject associated with hyperopia, displaying the emmetropization-manipulated digital images on a screen of the electronic device.

A person skilled in the art will recognize that the presently disclosed method and computer program may perform any of the features carried out by the processing unit of the image processing system.

BRIEF DESCRIPTION OF THE DRAWINGS

The below description refers to color with respect to some of the drawings, but all drawings are provided as greyscale images.

The invention will in the following be described with reference to the accompanying drawings, which are exemplary and not limiting to the presently disclosed image processing system and method for assisting emmetropization of a subject.

DETAILED DESCRIPTION OF THE INVENTION

Figure 1:
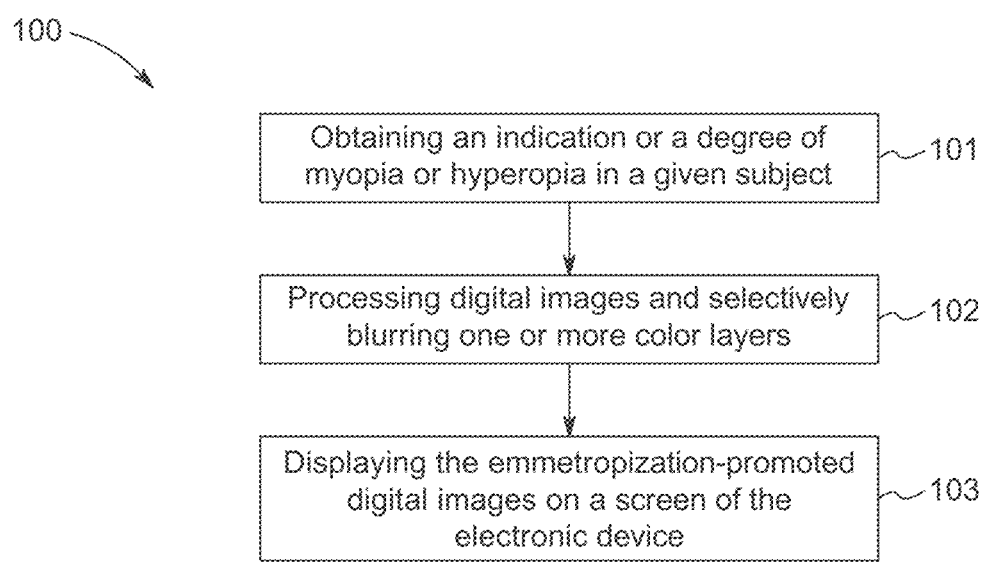
FIG. 1 shows a schematic diagram of steps carried out by the processing unit. A method (100) of assisting emmetropization of a subject, the embodiment of the method comprising steps of obtaining an indication of a degree of myopia or hyperopia (101), of processing the digital images and blurring the appropriate color layers (102) and of displaying the emmetropization-manipulated digital images on a screen of the electronic device (103) are illustrated.

The present disclosure relates to, according to a first embodiment, an image processing system comprising:
a display;
a processing unit configured to:
a. obtain an indication or a degree of myopia or hyperopia or emmetropia of a subject;
b. process digital images composed of a red color layer, a green color layer and a blue color layer or other color separation by selectively blurring the color layers based on the indication or degree of myopia or hyperopia or emmetropia of the subject to generate manipulated digital images,
 i. wherein the blue color layer of the digital images is blurred and the red color layer of the digital images is not modified, or sharpened, for a subject associated with myopia, and/or
 ii. wherein the red color layer of the digital images is blurred, and the blue color layer of the digital images is not modified, or sharpened, for a subject associated with hyperopia,
display the manipulated digital images on the display.

In one embodiment of the present disclosure, the individual color layers may be blurred, sharpened or left unchanged.

The color layers blue, green and red should be construed broadly and considered as the color layers that are selectively or semi-selectively sensed by the receptors or cones in the eye, namely short-wavelength sensitive cones, medium-wavelength sensitive cones and long-wavelength sensitive cones.

The presently disclosed application further relates to a computer program having instructions which, when executed by a computing device or computing system, cause the computing device or computing system to carry out a method of assisting emmetropization of a subject, the method comprising the steps of:
obtaining an indication or a degree of myopia or hyperopia or emmetropia of the subject;
processing digital images composed of a red color layer, a green color layer and a blue color layer or other color separation in an electronic device by selectively blurring the color layers based on the indication or degree of myopia or hyperopia or emmetropia of the subject to generate emmetropization-manipulated digital images, i. wherein the blue color layer of the digital images is blurred, and the red color layer of the digital images is not modified, or sharpened, for a subject associated with myopia, and/or ii. wherein the red color layer of the digital images is blurred, and the blue color layer of the digital images is not modified, or sharpened, for a subject associated with hyperopia, displaying the emmetropization-manipulated digital images on a screen of the electronic device.

In one embodiment, the system can separately manipulate red, green and blue color layers. The wavelength or wavelengths of the red color occupy a part of the electromagnetic spectrum where reception through the long-wavelength sensitive cone photoreceptors dominates, whereas the green color matches the medium-wavelength sensitive cones and the blue color matches the short-wavelength sensitive cones.

For some individuals, groups or entire species, including, for example, humans, other wavelengths, i.e. other colors than blue and red, may be more suitable to blur and sharpen/not modify to obtain the best effect against myopia or hyperopia. As would be recognized by a person skilled in the art, it is not necessarily the blue and red color layers that need to be blurred/sharpened/not modified, but the color layers for which the individual, group or species obtains the best effects. Consequently, the following image processing system and method for processing digital images in an electronic device may substitute any embodiment of image processing system and method for processing digital images in an electronic device in the present disclosure.

An image processing system comprising:
a display;
a processing unit configured to:
a. obtain an indication or a degree of myopia or hyperopia or emmetropia of a subject;
b. process digital images composed of a red color layer, a green color layer and a blue color layer or other color separation by selectively blurring the color layers based on the indication or degree of myopia or hyperopia or emmetropia of the subject to generate manipulated digital images,
 i. wherein a first color layer, such as the blue color layer, of the digital images is blurred and a second color layer, such as the red color, layer of the digital images is not modified, or sharpened, for a subject associated with myopia, and/or
 ii. wherein the second color layer, such as the red color layer, of the digital images is blurred and the first color layer, such as the blue color layer, of the digital images is not modified, or sharpened, for a subject associated with hyperopia, and/or
 iii. wherein edges extending in a first direction in the digital image are blurred, and wherein edges extending in a second direction substantially perpendicular to the first direction in the digital image are not modified, or sharpened, for a subject associated with astigmatism,
c. display the manipulated digital images on the display.

A method for processing digital images in an electronic device, the method comprising the steps of:
processing digital images composed of a red color layer, a green color layer and a blue color layer in an electronic device by selectively blurring the color layers based on an indication or a degree of myopia or hyperopia or emmetropia of a subject,
 i. wherein a first color layer, such as the blue color layer, of the digital images is blurred and a second color layer, such as the red color layer, of the digital images is not modified, or sharpened, for a subject associated with myopia, and/or
 ii. wherein the second color layer, such as the red color layer, of the digital images is blurred and the first color layer, such as the blue color layer, of the digital images is not modified, or sharpened, for a subject associated with hyperopia.

FIG. 1 describes one embodiment of the method (100) of assisting emmetropization of a subject, the embodiment of the method comprising steps of obtaining an indication of a degree of myopia or hyperopia (101), of processing the digital images and blurring the appropriate color layers (102) and of displaying the emmetropization-manipulated digital images on a screen of the electronic device (103).

Figure 2A:
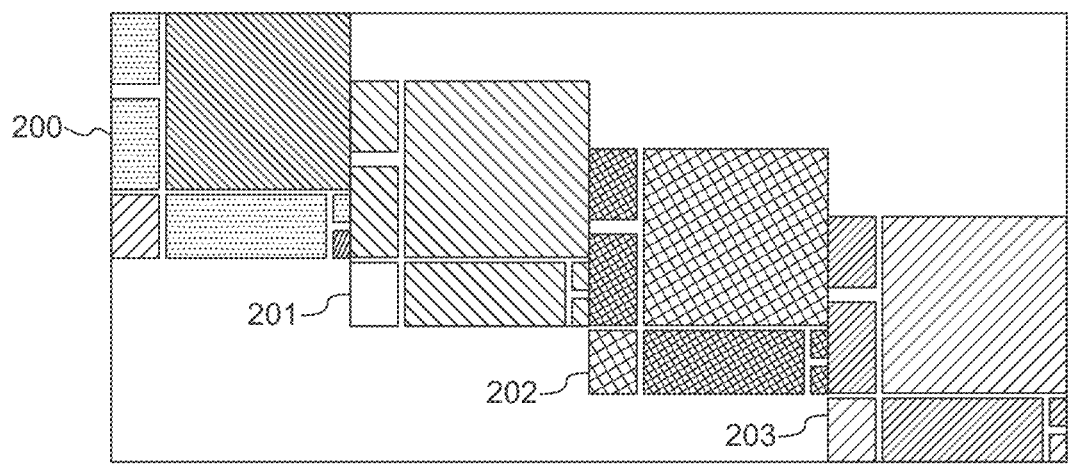
FIG. 2A shows a decomposition of an image (200) in three color layers, red (201), green (202) and blue (203)
Figure 2B:
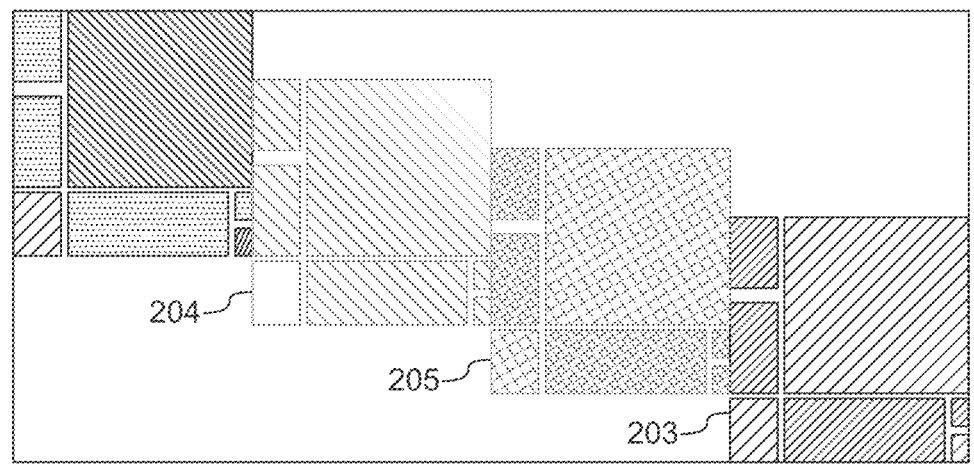
FIG. 2B shows that the red layer is blurred (204) and the green layer (205) is slightly blurred.
Figure 2C:
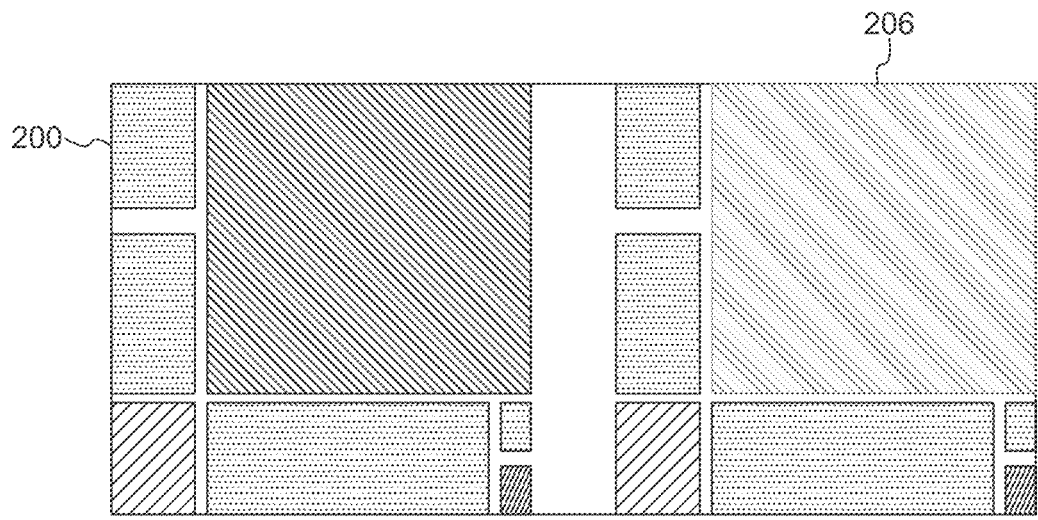
FIG. 2C shows an example of an original image (on the left) (200) and an image (on the right) (206) that has been modified by blurring of the red layer to some degree and by blurring of the green layer to a lesser degree, after which the three layers have been reassembled to form a modified version of the original full-color image.
Figure 3:
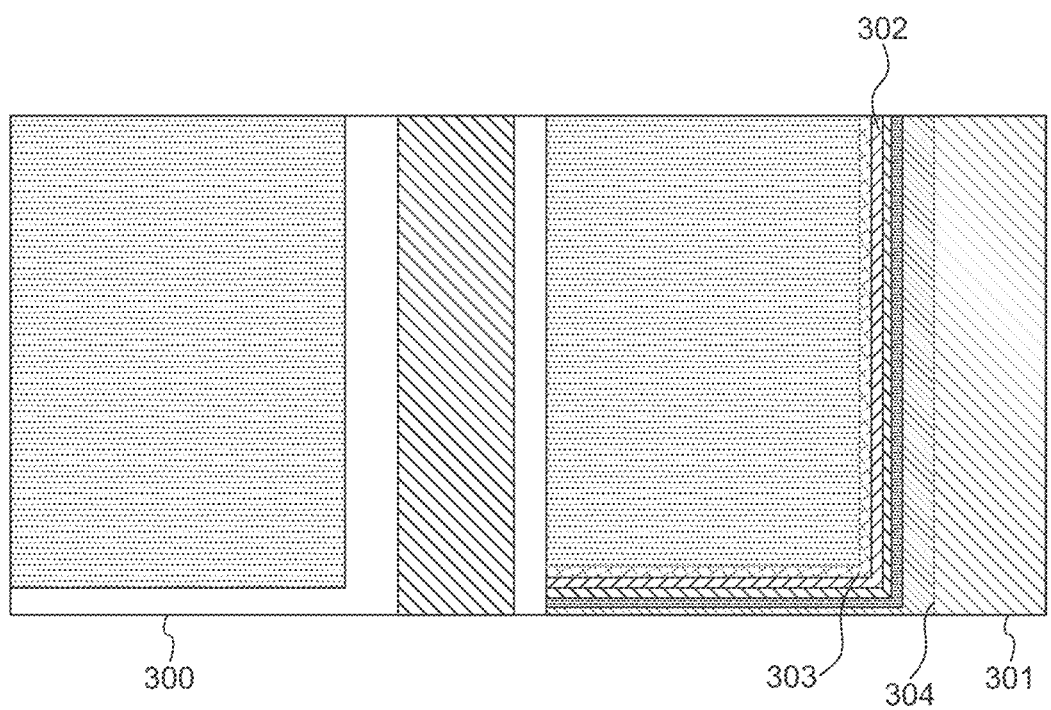
FIG. 3 shows a detail of the images from FIG. 2C. In this embodiment, the edge of the blue color layer is sharp, whereas the edge of the red and green is blurred.
Figure 6A:
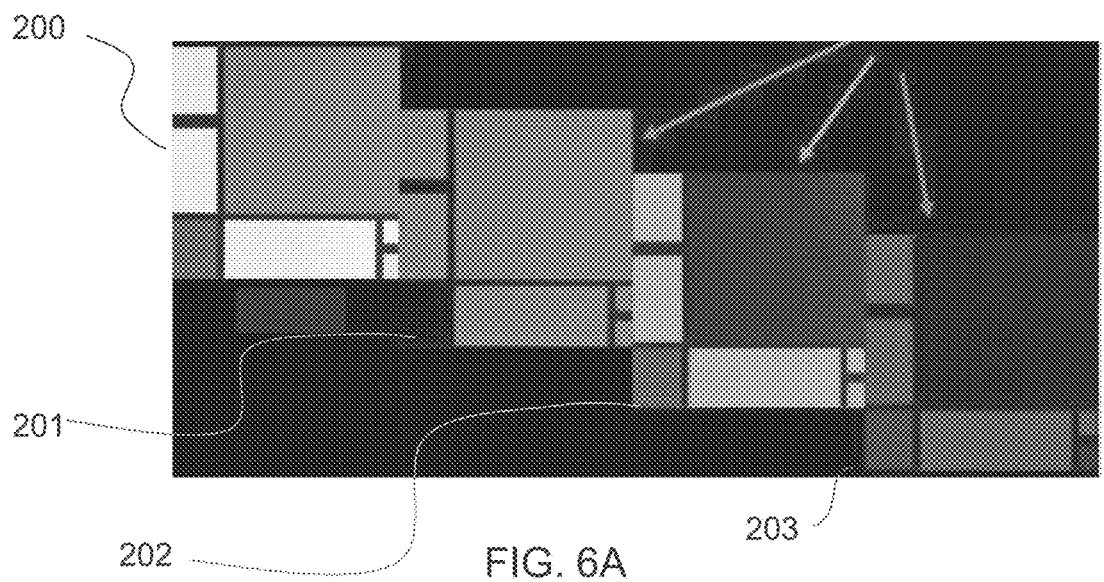
FIG. 6A shows a decomposition of an image (200) in three color layers, red (201), green (202) and blue (203)
Figure 6B:
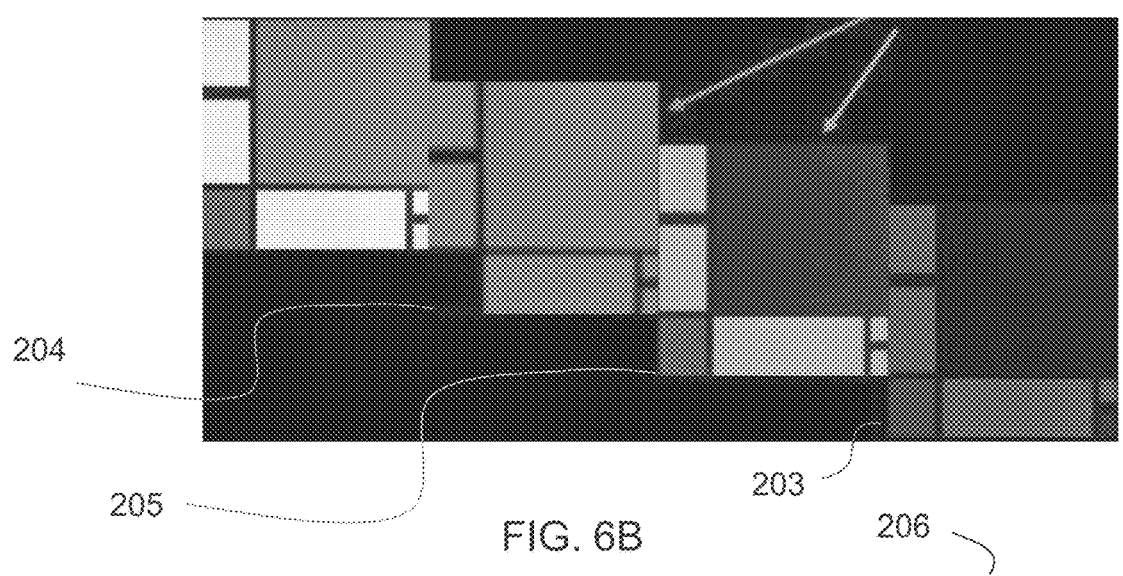
FIG. 6B shows that the red layer is blurred (204) and the green layer (205) is slightly blurred.
Figure 6C:
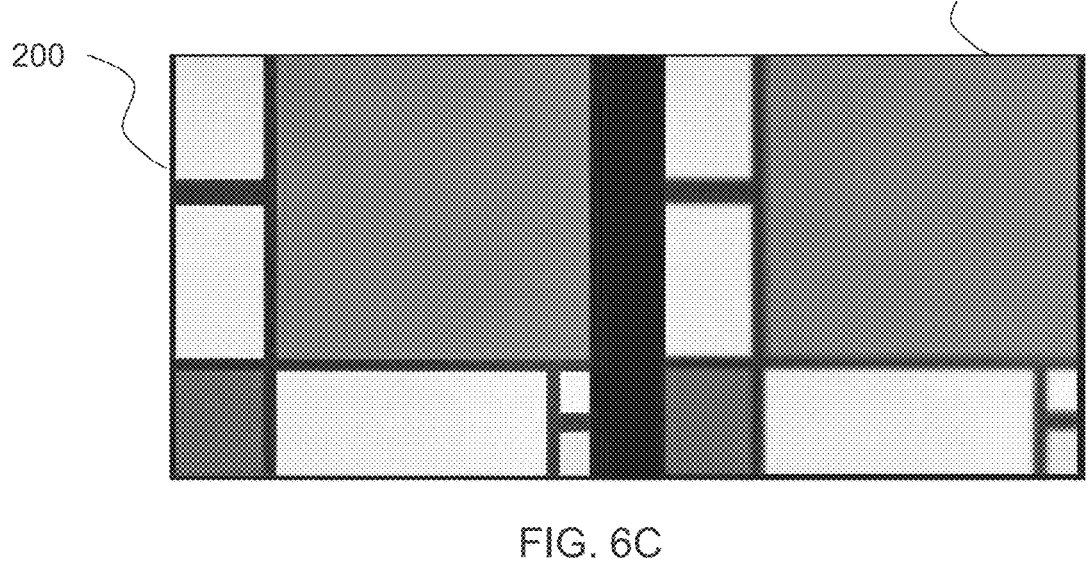
FIG. 6C shows an example of an original image (200) (on the left) and an image (on the right) (206) that has been modified by blurring of the red layer and minor blurring of the green layer.
Figure 7:
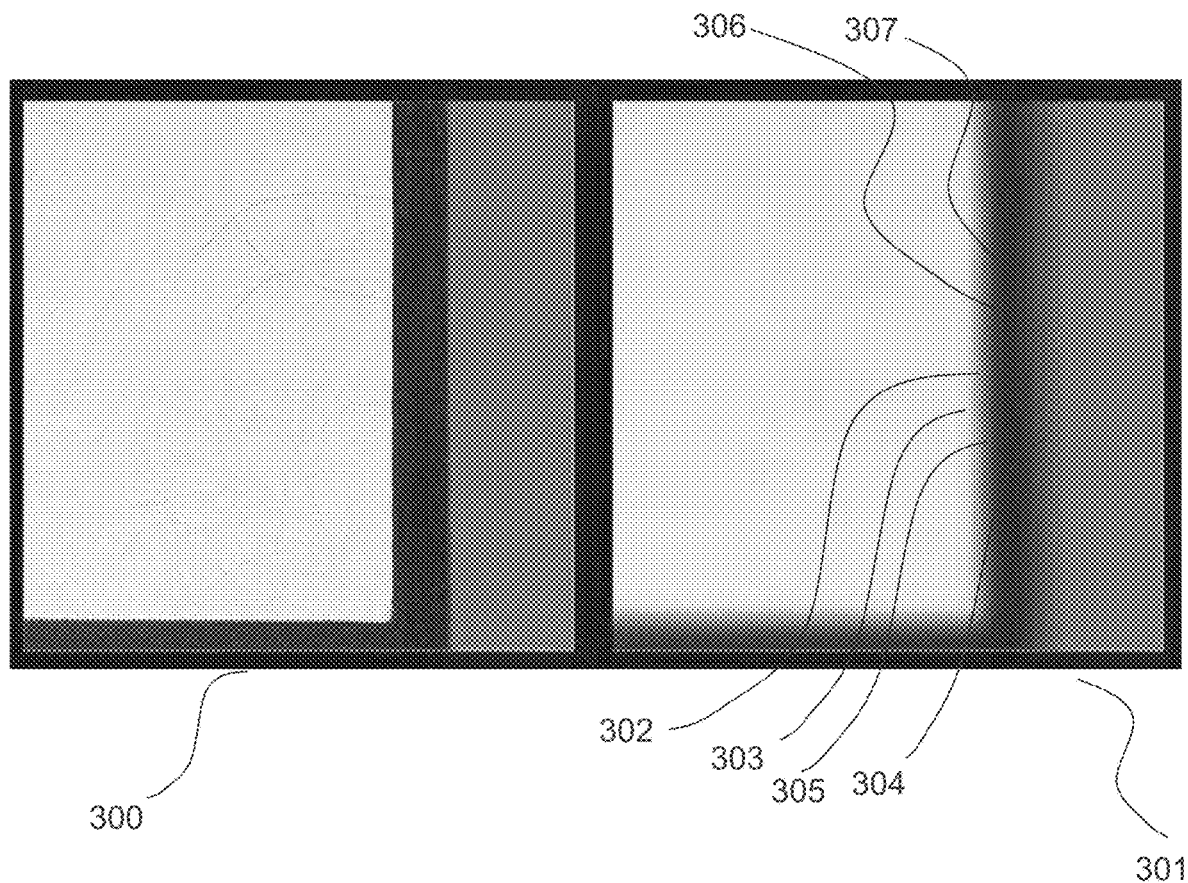
FIG. 7 shows a detail of the images from FIG. 6C. In this embodiment, the edge of the blue color layer is sharp, whereas the edge of the red and green is blurred. Note that for a human observer it is only the combined cerebral representation of the three color layers that is perceptible, not the individual color layers.

FIG. 2A shows an original image (200) made by a red color layer (201), a green color layer (202) and a blue color layer (203). In the figure, 200 denotes the original image, which has a mix of colors, illustrated by the different patterns of the areas. 201, 202 and 203 shows the separate color layers of the original image (200). As shown in FIG. 2B, in one embodiment of the method (100) of assisting emmetropization of a subject, if the subject is associated with hyperopia, the red and green color layers are modified, such that the red color layer (204) is blurred and the green color layer (205) is less blurred, whereas the blue color layer (203) is not modified, resulting in the final modified and reassembled three-color image (206), shown in FIG. 2C, which is displayed to the user. A detail of the not modified image (300) and the modified image (301) is shown in FIG. 3. From FIG. 3 it is possible to notice that the modification results in fringe effects. Specifically, as one approaches the vertical border between white and black from the left, an unsharp pale green line (303) emerges, as the gradual fading of the red color layer leads to a predominance of green and blue. This is followed by an unsharp pale blue line (302) that results from the continued fading of the red color layer and the added fading of the green color layer, which leads to a predominance of blue, and so on, through dark yellow (305) and dark red (306) until the transition to black (307) has been completed. A similar gradual transition (not shown in detail) occurs in the modified image at the next border (304), where a sharp transition from black to red (301) also has been modified in the red and green layers of the image. The appearance of colors other than red, green and blue demonstrates how the primary color sensation channels of the retina interact to produce the conscious, full-color percept of the scenery shown on the screen. FIG. 6A shows an original image (200) made by a red color layer (201), a green color layer (203) and a blue color layer (203). In the figure, 200 denotes the original image, which has a mix of colors, illustrated by the different patterns of the areas. 201, 202 and 203 show the separate color layers of the original image (200). As shown in FIG. 6B, in one embodiment of the method (100) of assisting emmetropization of a subject, if the subject is associated with hyperopia, the red and green color layers are modified, such that the red color layer (204) is blurred and the green color layer (205) is blurred, whereas the blue color layer (203) is not modified, resulting in the finally modified image (206), shown in FIG. 6C, which is displayed to the user. A detail of the not modified image (300) and the modified image (301) is shown in FIG. 7. From FIG. 7 it is possible to notice that the modification results in fringe effects. Specifically, as one approaches the vertical border between white and black from the left, an unsharp pale green line (303) emerges, as the gradual fading of the red color layer leads to a predominance of green and blue. This is followed by an unsharp pale blue line (302) that results from the continued fading of the red color layer and the added fading of the green color layer, which leads to a predominance of blue, and so on, through dark yellow (305) and dark red (306) until the transition to black (307) has been completed. A similar gradual transition (not shown in detail) occurs in the modified image at the next border (304), where a sharp transition from black to red (301) also has been modified in the red and green layers of the image. The appearance of colors other than red, green and blue demonstrates how the primary color sensation channels of the retina interact to produce the conscious, full-color percept of the scenery shown on the screen.

Figure 4:
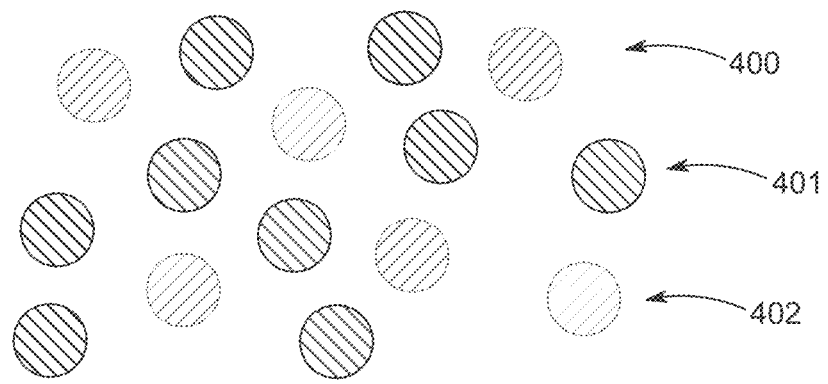
FIG. 4 shows an image with the blue color layer (402) blurred, whereas the red color layer (401) is not blurred. The blurring includes blurring the contours of the dots.
Figure 8:
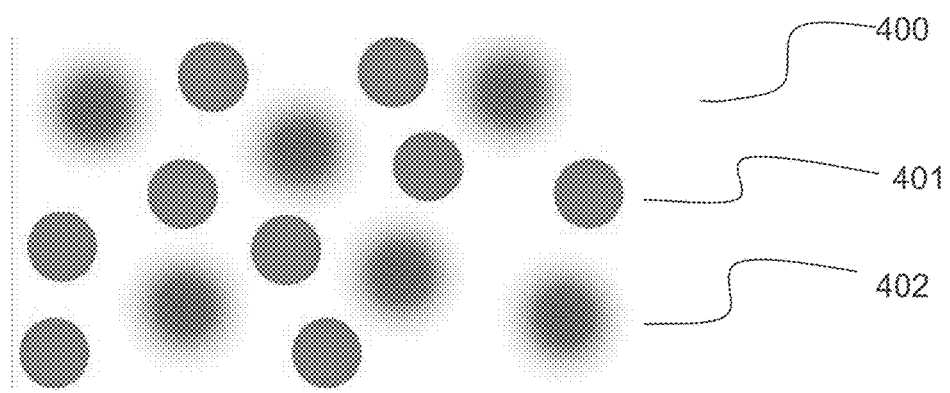
FIG. 8 shows a composite image made up of pure red (401) and blue (402) dots/pixels on a white background without overlapping of the red and blue components. The figure demonstrates the principle of showing features of one color with sharp edges and features of another color with blurred edges without the complexity that follows from the manner in which the human visual apparatus combines a set of limited primary colors into a combined full-color percept.

FIG. 4 and FIG. 8 show an image obtained by an embodiment of the method (100) where an image (400) is purposely composed to have blue components with blurred outlines (402) and red components with sharp outlines (401), to convey information in letters, drawing or images, for decorative purposes, to fill a background or a frame, on a uniform or patterned background, the background being monochrome or polychrome, of any luminosity or completely dark, with the aim of promoting a change in refraction in a desired direction, in this case an inhibition of myopia.

Figure 5:
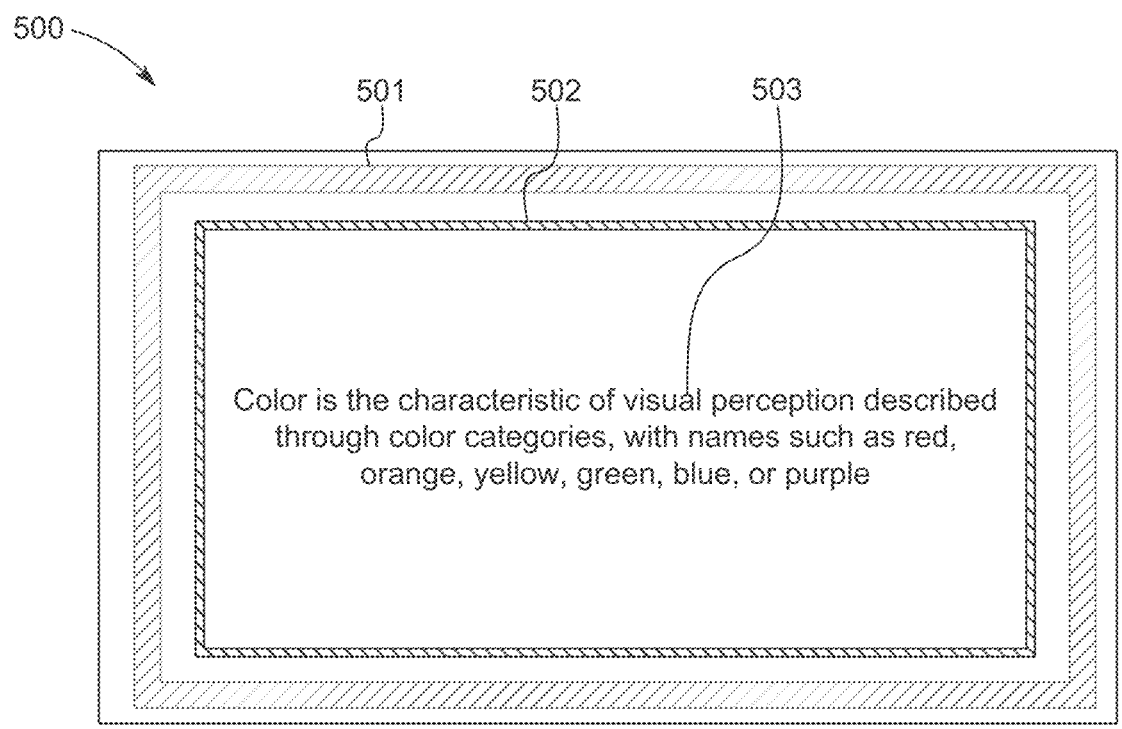
FIG. 5 shows, in an embodiment of the presently disclosed method, an image that has been modified by the presently disclosed method only at the contour, or at the border, and not in the central area (503). The image at the contour has a blurred blue color layer (501) and a sharp red color layer (502)
Figure 9:
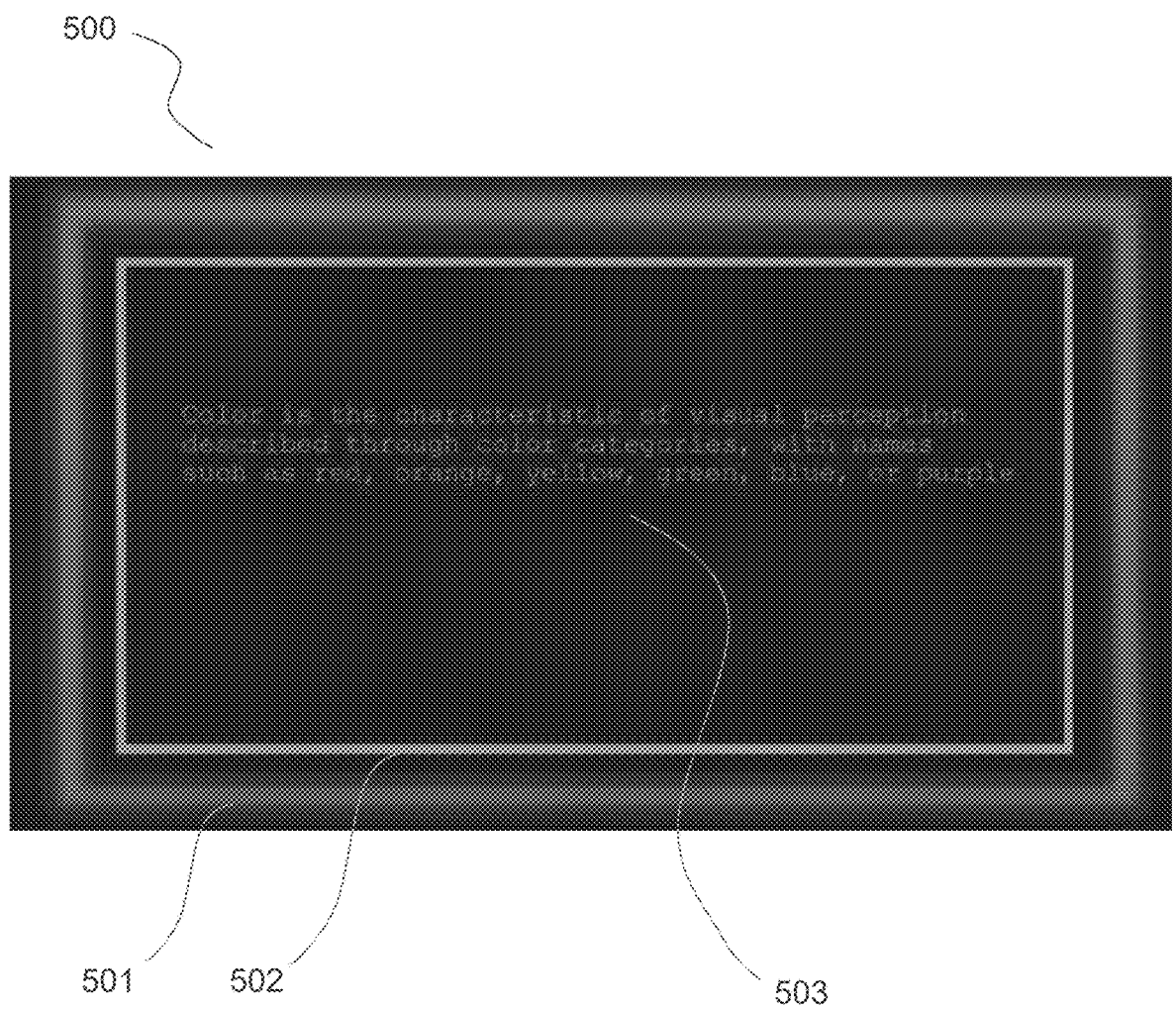
FIG. 9 shows the principle of maintaining sharp edges in a central field of attention, in this case a short text (503), whereas a more peripheral part of the visual field of an observer is filled with features that have sharp edges in one color (502, red) and blurred edges in another color (501, blue). The features of any part of the visual field can be of any color, primary or composite, with a sharpness of contour tuned to the need of the individual user and the individual user's direction of gaze and point of fixation on the screen and updated according to any shift in these user characteristics, as they are monitored by a camera or other function of the device or brought under control by features of the image or sequence of images on the display.

FIG. 5 and FIG. 9 show an image obtained by an embodiment of the method (100) where an image or text of type is not altered in its central part (503), whereas its peripheral part is designed or altered to present sharp contours in one color (502) and blurred contours in another color (501), so as to promote a change in refraction in a desired direction, in this case an inhibition of myopia. In one embodiment, the designed pattern or the modification of a preexisting pattern or image is modified in different directions or color/sharpness balance and to different degrees according to information acquired on beforehand about the refraction and or distance from the surface of the eye to the retina corresponding to different locations in the visual field. In a further embodiment, the direction of gaze of the user is monitored in real time and the pattern or modification of an image is adjusted in real time to the user's eye movements, so that the direction and degree of color/sharpness balance modification remains stable for a given location in the users visual field.

Emmetropization is a phenomenon by which the eye elongates or stops elongating based on cues depending on the degree of focus of the different color layers of the eye. This is because in humans there are three main types of light receptors or cones that are active in daylight: short-wavelength sensitive cones, medium-wavelength sensitive cones and long-wavelength-sensitive cones, which typically correspond to the color layers of blue, green and red. Emmetropization is a phenomenon where the eye naturally elongates or stops elongating based on the degree of contrast or blurriness of the different color layers on the retina of the eye of the subject. In particular, it is understood that when the blue image is blurred and the red is not modified, the eye will stop elongating. On the other hand, when the red image is blurred, and the blue is not modified then the eye will elongate.

In one embodiment, the display of the image processing system can display several color layers separately, at least three, namely blue, green and red, and can display the different color layers with different levels of blurriness. These color layers roughly correspond to the preferred sensitivity wavelengths of the cone photoreceptors in the human eye, namely the short-wavelength sensitive cones, the medium-wavelength sensitive cones and the long-wavelength-sensitive cones.

According to one embodiment of the presently disclosed method, the digital images are processed by a computer program running on the processing system. The system is then configured to blur selectively the different color layers to assist the emmetropization of the subject. In particular, for a near-sighted subject the blue layer is blurred and for a far-sighted subject the red layer is blurred. The system may process the images by using a computer program running on the processing unit or by using a graphical hardware accelerator or by a combination or by other means an image processing unit can process an image and decompose it in its red, green and blue layers.

When the subject is exposed to the computer modified images, the level of contrast or blurriness of the different color layers creates cues at the level of the receptors in the eye of the subject. In particular the three types of receptors or cones in the human eye, namely short-wavelength sensitive cones, medium-wavelength sensitive cones and long-wavelength-sensitive cones are stimulated by the emmetropization-assisted images that are generated by the presently disclosed method.

The presently disclosed invention, in one embodiment, is extended in such a way that one of the color layers is omitted or shifted to a different color layer. The processing system has sufficient configurability in the software or in the hardware to implement various configurations of manipulation of the different color layers of the images produced on the screen.

In one embodiment, the degree of blurring matches that of at least one or at least two diopters of chromatic aberration. This is done in order to achieve a sufficient level of blurriness to assist the emmetropization-assisted process and depends on the condition of the subject.

In one embodiment, the blurring of the blue color layer is set to match to at least one, or at least two, or at least three diopters of defocus. This is done in order to achieve a sufficient level of blurriness to promote the emmetropization-assisted process and depends on the condition of the subject.

In one embodiment, the processing system is configured to generate a level of blurriness, for the required layer or layers, to match to at least one, or at least two, or at least three diopters of defocus.

In one embodiment, the level of blurring is determined by a degree of myopia or hyperopia of the subject. The degree of myopia or hyperopia of the subject can be entered as an input in the processing system and the system has enough configurability to be able to modify the processing of the color layers depending on parameters entered by the user or on parameters sensed by the processing system itself.

The processing system may have sensors that can measure conditions of the subject. In one embodiment the processing system may be performing eye tracking. In one embodiment the processing system can perform measurement of the user's pupil diameters. In one embodiment the processing system may identify if the subject is wearing spectacles or contact lenses. In one embodiment the processing system may measure ambient light conditions. In one embodiment the processing system may perform automatic measurements of different external parameters, or it could accept manual values of external parameters as a user input, and it may perform selective blurring or sharpening of color layers of selective increase in luminosity based on such parameters.

In one embodiment, the system is configured to receive information about ocular health conditions, physiological parameters, ocular and extraocular conditions that may guide the user to the proper use of the system, such as differences between refraction in a person's two eyes, color blindness, cone photoreceptor dysfunction, strabismus and trauma.

The processing system is configured to modify the processing of the color layers depending on input parameters. Some input parameters, such as pupil diameters, may be automatically obtained and sensed by the electronic device. Other parameters, such as the degree of myopia or hyperopia, can be entered in the device by the subject or imported from an electronic data source.

In one embodiment, the blurring of the color layers comprises a reduction of detail in a color layer of the digital images, and/or a smoothing, such as Gaussian smoothing, of the color layer of the digital images, and/or applying a low-pass filter.

In one embodiment, sharpening the color layers comprises applying a high-pass filter.

In one embodiment, the electronic device that implements the presently disclosed method is configurable to use any known algorithm to obtain blurring or sharpening of the selected color layers.

In a further embodiment, the presently disclosed method is used to assist a subject in a phase of emmetropia, in order to avoid potential incurring of myopia.

Feedback Parameters

In one embodiment, the presently disclosed processing system comprises use of information related to the user and the ambience around the user to manipulate the level of blurriness of the selected layers.

In particular, in one embodiment, the presently disclosed method further comprises the step of monitoring a pupil diameter or both pupil diameters of the subject and adjusting a level of contrast and blurring of the color layers based on a width of the pupil or the widths of both pupils. The system may be configured to automatically measure the user's pupil diameters and automatically adjust the level of blurriness of the different color layers based on the user's pupil diameters.

Subsequently, in one embodiment, the presently disclosed system can achieve a level of blurring determined by a distance between the subject and the screen, and/or determined by whether the subject wears spectacles or contact lenses. The system may be configured to automatically determine the distance between the subject and the screen and/or to automatically determine if the subject wears spectacles and automatically adjust the level of blurriness of the different color layers based on that information.

Furthermore, in another embodiment, the present system can be configured to modulate the luminosity and/or the blurriness of the image if ambient light generates excessive diffusely scattered light in the surroundings of the subject. The electronic device may be configured to automatically determine the level of ambient light and automatically adjust the level of blurriness of the different color layers based on that information.

In another embodiment, the presently disclosed system may collect information about the subject related to the duration and the time of day of the subject's exposure to the method, and may further adjust exposure based on the collected time of exposure and an analysis of progression of the emmetropization of the eye.

In another embodiment of the system, it will collect information about the identity of the user or user at any time and distinguish between users and coordinate a given user's exposure across a multitude of platforms and devices. The system will also be able to react to the system being used by a multitude of users on the same display, for instance by reverting to default settings.

In another embodiment of the system, it will collect information about the geographical location of the device and modify the user's access to the system's functionalities according to regulations of the local jurisdiction.

In another embodiment of the system, it will obtain authorization from a registered health care practitioner to be used on the authorized health care practitioner's prescription for a named user.

In another embodiment of the system, it will return information to the health care practitioner for use in the continued adjustment of system use by a named user.

Blur of Parts of the Image

The presently disclosed method, in one embodiment, is applied to only parts of the image, in a pre-defined way or based on feedback from the user. This way the user can enjoy, for example, an unmodified video content at the center of the screen, while still being exposed to emmetropization-assisting images at periphery of the screen, which is observed by the user's peripheral visual field.

An embodiment of the image obtained by the processing unit is shown in FIG. 5. In FIG. 5 an image is shown (500) where the red text (503) at the center of the image and the red contour (502) are not blurred, whereas the blue contour (501) is blurred.

In one embodiment, the processing unit can perform tracking of eye motion, and perform selective blurring based on the tracked eye motion, and may further process the image in such a way that only parts of the digital images on which the eye is not fixating are blurred, and/or in such a way that only digital images in border areas, and not center areas, of the screen are blurred, and/or in such a way that only an identified or predetermined object is blurred.

Blur of Green

In one embodiment, the presently disclosed method, comprises the step of blurring the green color layer. In particular, in one embodiment of the presently disclosed method the green color layer is blurred less than the blue color layer for a subject associated with myopia and, oppositely, the green color layer is blurred less than the red color layer for a subject associated with hyperopia.

Method

The presently disclosed invention, further relates to a method of assisting emmetropization of a subject, the method comprising the steps of:

obtaining an indication or a degree of myopia or hyperopia or emmetropia of the subject;

processing digital images composed of a red color layer, a green color layer and a blue color layer or other color separation in an electronic device by selectively blurring the color layers based on the indication or degree of myopia or hyperopia or emmetropia of the subject to generate emmetropization-manipulated digital images, i. wherein the blue color layer of the digital images is blurred, and the red color layer of the digital images is not modified, or sharpened, for a subject associated with myopia, and/or ii. wherein the red color layer of the digital images is blurred, and the blue color layer of the digital images is not modified, or sharpened, for a subject associated with hyperopia, displaying the emmetropization-manipulated digital images on a screen of the electronic device.

In one embodiment, the presently disclosed method further comprises the step of collecting user data for statistical purposes.

In one embodiment, a system that implements the presently disclosed method is configured to manipulate the images before displaying them, in a separate batch process, or in real time, as the rate by which the images, e.g. the image in a video recording, is intended to be displayed, with a minimum of delay.

In one embodiment, the presently disclosed method is such that the digital images are manipulated before being displayed or in real time while being displayed.

The present disclosure relates furthermore to a computer program having instructions which, when executed by the system, cause the system to carry out the method of assisting emmetropization of a subject.

The system capable of manipulating the images according to the described method may, in one embodiment, have a central processing unit, a random access memory, a set of sensors, and may have a graphic processing unit.

A person skilled in the art will recognize that the system of the presently disclosed invention with a screen can implement the presently disclosed method by modifying the level of blurriness of the selected color layers and displaying them on the screen.

A person skilled in the art will recognize that the electronic device of the presently disclosed invention with a screen can implement the presently disclosed method by modifying the level of blurriness of the selected color layers and displaying them on the screen, in the same way as the image processing system does.

FURTHER DETAILS

1. An image processing system for assisting emmetropization of a subject comprising:
   a display;
   a processing unit configured to:
      obtain an indication or a degree of myopia or hyperopia or emmetropia of a subject;
      process digital images composed of a red color layer, a green color layer and a blue color layer or other color separation by selectively blurring the color layers based on the indication or degree of myopia or hyperopia or emmetropia of the subject to generate manipulated digital images,
   wherein the blue color layer of the digital images is blurred, and the red color layer of the digital images is not modified, or sharpened, for a subject associated with myopia, and/or
   wherein the red color layer of the digital images is blurred, and the blue color layer of the digital images is not modified, or sharpened, for a subject associated with hyperopia,
      display the manipulated digital images on the display.
2. The image processing system according to item 1, wherein the digital images are processed by a computer program running on an electronic device, or by a hardware unit in an electronic device.
3. The image processing system according to any of the preceding items, wherein the processing unit is configured to omit or shift one of the color layers to a different color layer.
4. The image processing system according to any of the preceding items, wherein the processing unit is configured to monitor a pupil diameter of the subject and adjusting a level of contrast and blurring of the color layers based on the width of the pupil.
5. The image processing system according to any one of the preceding items, wherein the processing unit is configured to track eye motion, and perform selective blurring based on the tracked eye motion.
6. The image processing system according to item 5, wherein only parts of the digital images on which the eye is not fixated are blurred.
7. The image processing system according to any one of the preceding items, wherein only digital images in border areas, and not center areas, of the screen are blurred.
8. The image processing system according to any one of the preceding items, wherein only an identified or predetermined object is blurred.
9. The image processing system according to any one of the preceding items, wherein a level of blurring is determined by a distance between the subject and the screen, and/or determined by whether the subject wears spectacles or contact lenses.
10. The image processing system according to any one of the preceding items, wherein the processing unit is configured to blur the blue color layer of the digital images and not modify or sharpen the red color layer of the digital images, for a subject associated with emmetropia.
11. The image processing system according to any one of the preceding items, wherein the processing unit is configured to blur the green color layer.
12. The image processing system according to item 11, wherein the processing unit is configured to blur the green color layer less than blue color layer for a subject associated with myopia.
13. The image processing system according to any one of items 11-12, wherein the processing unit is configured to blur the green color layer less than red color layer for a subject associated with hyperopia.
14. The image processing system according to any one of the preceding items, wherein the processing unit is configured to manipulate the digital images before being displayed or in substantially real-time while being displayed.
15. The image processing system according to any one of the preceding items, wherein the degree of blurring matches that of at least one or at least two diopters of chromatic aberration.
16. The image processing system according to any one of the preceding items, wherein the processing unit is configured further to collect information of the subject related to time of exposure of the image processing system, and adjust exposure based on the collected time of exposure and an analysis of progression of emmetropization of the eye.
17. The image processing system according to any of the preceding items, wherein the processing unit is configured to set the blurring of the blue color layer to match to at least one, or at least two, or at least three diopters of defocus.
18. The image processing system according to any of the preceding items, wherein the processing unit is configured to increase a level of blurriness when ambient light generates excessively diffusely scattered light in surroundings of the subject.
19. The image processing system according to any of the preceding items, wherein the processing unit is configured to set a level of blurring determined by a degree of myopia or hyperopia of the subject.
20. The image processing system according to any of the preceding items, wherein the processing of digital images is based on the age of the subject.
21. The image processing system according to any of the preceding items, wherein the processing unit is configured to automatically identify the subject.
22. The image processing system according to any of the preceding items, wherein blurring the color layers comprises a reduction of detail in a color layer of the digital images, and/or a smoothing, such as Gaussian smoothing, of the color layer of the digital images, and/or applying a low-pass filter.
23. The image processing system according to any of the preceding items, wherein the processing unit is configured to apply a high-pass filter when sharpening a color layer.
24. A computer program having instructions which, when executed by a computing device or computing system, cause the computing device or computing system to carry out a method of assisting emmetropization of a subject, the method comprising the steps of:
obtaining an indication or a degree of myopia or hyperopia or emmetropia of the subject;
processing digital images composed of a red color layer, a green color layer and a blue color layer or other color separation in an electronic device by selectively blurring the color layers based on the indication or degree of myopia or hyperopia or emmetropia of the subject to generate emmetropization-manipulated digital images,
wherein the blue color layer of the digital images is blurred, and the red color layer of the digital images is not modified, or sharpened, for a subject associated with myopia, and/or
wherein the red color layer of the digital images is blurred, and the blue color layer of the digital images is not modified, or sharpened, for a subject associated with hyperopia,
displaying the emmetropization-manipulated digital images on a screen of the electronic device.
25. The computer program according to item 24, wherein the method carried out by the computing device or computing system comprises any of the steps carried out by the image processing system of items 1-23.
26. A method of assisting emmetropization of a subject, the method comprising the steps of:
obtaining an indication or a degree of myopia or hyperopia or emmetropia of the subject;
processing digital images composed of a red color layer, a green color layer and a blue color layer or other color separation in an electronic device by selectively blurring the color layers based on the indication or degree of myopia or hyperopia or emmetropia of the subject to generate emmetropization-manipulated digital images,
wherein the blue color layer of the digital images is blurred, and the red color layer of the digital images is not modified, or sharpened, for a subject associated with myopia, and/or
wherein the red color layer of the digital images is blurred, and the blue color layer of the digital images is not modified, or sharpened, for a subject associated with hyperopia,
displaying the emmetropization-manipulated digital images on a screen of the electronic device.

27. The method of assisting emmetropization of a subject according to item 26, comprising any of the steps carried out by the image processing system of items 1-23.
28. A method for processing digital images in an electronic device, the method comprising the steps of:
processing digital images composed of a red color layer, a green color layer and a blue color layer in an electronic device by selectively blurring the color layers based on an indication or a degree of myopia or hyperopia or emmetropia of a subject,
wherein the blue color layer of the digital images is blurred, and the red color layer of the digital images is not modified, or sharpened, for a subject associated with myopia, and/or
wherein the red color layer of the digital images is blurred, and the blue color layer of the digital images is not modified, or sharpened, for a subject associated with hyperopia.
29. The method for processing digital images in an electronic device according to item 28, comprising any of the steps carried out by the image processing system of items 1-23.
30. An image processing system comprising:
a display;
a processing unit configured to:
obtain an indication or a degree of myopia or hyperopia or emmetropia of a subject;
process digital images composed of a red color layer, a green color layer and a blue color layer or other color separation by selectively blurring the color layers based on the indication or degree of myopia or hyperopia or emmetropia of the subject to generate manipulated digital images,
wherein a first color layer, such as the blue color layer, of the digital images is blurred and a second color layer, such as the red color, layer of the digital images is not modified, or sharpened, for a subject associated with myopia, and/or
wherein the second color layer, such as the red color layer, of the digital images is blurred and the first color layer, such as the blue color layer, of the digital images is not modified, or sharpened, for a subject associated with hyperopia,
display the manipulated digital images on the display.
31. A method for processing digital images in an electronic device, the method comprising the steps of:
processing digital images composed of a red color layer, a green color layer and a blue color layer in an electronic device by selectively blurring the color layers based on an indication or a degree of myopia or hyperopia or emmetropia of a subject,
wherein a first color layer, such as the blue color layer, of the digital images is blurred and a second color layer, such as the red color layer, of the digital images is not modified, or sharpened, for a subject associated with myopia, and/or
wherein the second color layer, such as the red color layer, of the digital images is blurred and the first color layer, such as the blue color layer, of the digital images is not modified, or sharpened, for a subject associated with hyperopia.

The invention claimed is:
1. An image processing system comprising:
a display;
a processing unit configured to:

obtain an indication or a degree of myopia or hyperopia or emmetropia of a subject;

process digital images composed of a red color layer, a green color layer and a blue color layer or other color separation by selectively blurring the color layers based on the indication or degree of myopia or hyperopia or emmetropia of the subject to generate manipulated digital images, wherein the blue color layer of the digital images is blurred, and the red color layer of the digital images is not modified, or sharpened, for a subject associated with myopia, and/or wherein the red color layer of the digital images is blurred, and the blue color layer of the digital images is not modified, or sharpened, for a subject associated with hyperopia, display the manipulated digital images on the display.

2. The image processing system according to claim 1, wherein the digital images are processed by a computer program running on an electronic device, or by a hardware unit in an electronic device.

3. The image processing system according to claim 1, wherein only an identified or predetermined object is blurred.

4. The image processing system according to claim 1, wherein the processing unit is configured to blur the blue color layer of the digital images and not modify or sharpen the red color layer of the digital images, for a subject associated with emmetropia.

5. The image processing system according to claim 1, wherein the processing unit is configured to blur the green color layer.

6. The image processing system according to claim 1, wherein the processing unit is configured to blur the green color layer less than blue color layer for a subject associated with myopia.

7. The image processing system according to claim 1, wherein the processing unit is configured to blur the green color layer less than red color layer for a subject associated with hyperopia.

8. The image processing system according to claim 1, wherein the processing unit is configured to set a level of blurring determined by a degree of myopia or hyperopia of the subject.

9. The image processing system according claim 1, wherein the processing unit is further configured to blur edges extending in a first direction in the digital image, and not modify or sharpen edges extending in a second direction substantially perpendicular to the first direction for a subject associated with astigmatism.

10. A method for processing digital images in an electronic device, the method comprising the steps of:

processing digital images composed of a red color layer, a green color layer and a blue color layer in an electronic device by selectively blurring the color layers based on an indication or a degree of myopia or hyperopia or emmetropia of a subject, wherein the blue color layer of the digital images is blurred, and the red color layer of the digital images is not modified, or sharpened, for a subject associated with myopia, and/or wherein the red color layer of the digital images is blurred, and the blue color layer of the digital images is not modified, or sharpened, for a subject associated with hyperopia.

11. An image processing system comprising:

a display;

a processing unit configured to:

obtain an indication or a degree of myopia or hyperopia or emmetropia of a subject;

process digital images composed of a red color layer, a green color layer and a blue color layer or other color separation by selectively blurring the color layers based on the indication or degree of myopia or hyperopia or emmetropia of the subject to generate manipulated digital images, wherein a first color layer, such as the blue color layer, of the digital images is blurred and a second color layer, such as the red color, layer of the digital images is not modified, or sharpened, for a subject associated with myopia, and/or wherein the second color layer, such as the red color layer, of the digital images is blurred and the first color layer, such as the blue color layer, of the digital images is not modified, or sharpened, for a subject associated with hyperopia, and/or wherein edges extending in a first direction in the digital image are blurred, and wherein edges extending in a second direction substantially perpendicular to the first direction in the digital image are not modified, or sharpened, for a subject associated with astigmatism, display the manipulated digital images on the display.

* * * * *